(12) United States Patent
Nakabayashi et al.

(10) Patent No.: US 7,158,673 B2
(45) Date of Patent: Jan. 2, 2007

(54) IMAGE-PROCESSING APPARATUS AND IMAGE-PROCESSING METHOD

(75) Inventors: Kiyotaka Nakabayashi, Tokyo (JP); Naoya Kato, Chiba (JP)

(73) Assignee: Sony Corporation, Tokyo (JP)

( * ) Notice: Subject to any disclaimer, the term of this patent is extended or adjusted under 35 U.S.C. 154(b) by 136 days.

(21) Appl. No.: 11/087,124

(22) Filed: Mar. 23, 2005

(65) Prior Publication Data

US 2005/0220340 A1 Oct. 6, 2005

Related U.S. Application Data

(63) Continuation of application No. 09/455,576, filed on Dec. 6, 1999, now Pat. No. 6,912,306.

(30) Foreign Application Priority Data

Dec. 7, 1998 (JP) ............................... 10-347341

(51) Int. Cl.
*G06K 9/00* (2006.01)

(52) U.S. Cl. ...................... 382/167; 358/518

(58) Field of Classification Search ........ 382/162–167; 358/516–527, 1.9; 345/589–604; 714/721
See application file for complete search history.

(56) References Cited

U.S. PATENT DOCUMENTS

| 5,754,448 | A   | 5/1998 | Edge et al. ................. 358/516 |
| 5,754,558 | A   | 5/1998 | Hayakawa et al. ......... 714/721 |
| 5,754,682 | A   | 5/1998 | Katoh ......................... 382/167 |
| 5,956,044 | A   | 9/1999 | Giorgianni et al. ......... 358/518 |
| 6,101,272 | A   | 8/2000 | Noguchi ..................... 382/167 |
| 6,124,944 | A   | 9/2000 | Ohta ........................... 358/578 |
| 6,205,246 | B1  | 3/2001 | Usami ........................ 382/167 |
| 6,229,916 | B1  | 5/2001 | Ohkubo ...................... 382/167 |
| 6,362,830 | B1  | 3/2002 | Walraven .................... 345/600 |
| 6,480,202 | B1* | 11/2002 | Deguchi et al. ............ 345/600 |
| 6,560,358 | B1* | 5/2003 | Tsukada ...................... 382/167 |
| 6,628,822 | B1* | 9/2003 | Nakabayashi et al. ...... 382/162 |

FOREIGN PATENT DOCUMENTS

| EP | 0 851 669   | 7/1998 |
| WO | WO 95 17071 | 6/1995 |
| WO | WO 99 00648 | 1/1999 |

OTHER PUBLICATIONS

Katoh Naoya: "Appearance match between soft copy and hard copy under mixed chromatic adaptation" Proceedings of the 1995 3$^{RD}$ Color Imaging Conference: Color Science, Systems, and Applications; Scottsdale, AZ, USA Nov. 7-10, 1995, pp. 22-25, XP002174811 Proc Color Imaging Conf. Color Sci Syst Appl; Proceedings of the Color Imaging Conference: Color Science, Systems, and Applications 1995 Soc Imaging Sci Technol, Springfield, VA, USA.

* cited by examiner

*Primary Examiner*—Ishrat Sherali
(74) *Attorney, Agent, or Firm*—Frommer Lawrence & Haug LLP; William S. Frommer

(57) ABSTRACT

An image-processing apparatus for processing the image data input from an image-handling device and then outputting the image data to another image-handling device. The apparatus comprises a black-adaptation correction device. The black-adaptation correction device corrects the image data in consideration of the fact that adaptation to black varies from person to person, if the darkest points of the image-handling devices differ from each other. Since the image is so corrected, the colors of the images produced by the image-handling devices look almost the same in spite of the fact that the darkest points of the image-handling devices differ from each other.

1 Claim, 11 Drawing Sheets

51 : IMAGE-PROCESSING APPARATUS
2 : IMAGE DISPLAY able apparatus for the apparatus shown in FIG.

IMAGE-PROCESSING APPARATUS AND IMAGE-PROCESSING METHOD

This is a continuation of application Ser. No. 09/455,576 filed Dec. 6, 1999 now U.S. Pat. No. 6,912,306, the entirety of which is incorporated herein by reference.

BACKGROUND OF THE INVENTION

The present invention relates to an apparatus for processing the image data input from an image-handing device and then outputting the image data to another image-handling device. The invention also relates to a method of processing image data input from an image-handing device before the image data is output to another image-handling device.

As various systems which handle color images come into use in increasing numbers, it is demanded that color images be reproduced in the same hues by the devices of different types that are used in these systems. To meet this demand, image-processing apparatuses have been proposed, each designed to evaluate the devices for their characteristics and adjust the color values of the image output from the devices to the same value. FIG. 1 shows such an image-processing apparatus. FIG. 2 illustrates the flow of image data in the image-processing apparatus shown in FIG. 1.

Even if the color values of the images output from the devices are adjusted to the same value, however, the colors of the images do not always appear identical to human eyes. This is because the observation environment including ambient light influences the human visual sense. That is to say, the same color looks different in different observation environments.

The devices may differ in terms of the darkest points. (That is, the black part of the image that one device outputs may differ from that of the image that another device outputs.) Particularly in this case, the images output by the devices appear greatly different. Assume that the darkest point of an input device differs from that of an output device. Then, either graying or black-emphasizing occurs in the image output by the output device. Consequently, the input image and the output image may look quite different in terms of color.

BRIEF SUMMARY OF THE INVENTION

The present invention has been made in consideration of the foregoing. The object of the invention is to provide an image-processing apparatus and an image-processing method which process image data so that the images represented by the data and reproduced by different devices may look almost identical in terms of color.

According to the first aspect of the present invention, there is provided an image-processing apparatus for processing the image data input from an image-handling device and then outputting the image data to another image-handling device. The image-processing apparatus comprises black-adaptation correction means for correcting the image data in consideration of the fact that adaptation to black varies from person to person, if the darkest points of the image-handling devices differ from each other, so that the colors of the images produced by the image-handling devices look almost the same.

In the image-processing apparatus, the black-adaptation correction means corrects the image data if the darkest points of the image-handling devices differ from each other, in consideration of the fact that adaptation to black varies from person to person. Hence, the colors of the images produced by the image-handling devices look almost the same even if the darkest points of the image-handling devices differ from each other.

According to the second aspect of the invention, there is provided a method of processing image data input from an image-handing device before the image data is output to another image-handling device. The method comprises the step of correcting the image data in consideration of the fact that adaptation to black varies from person to person, if the darkest points of the image-handling devices differ from each other, so that the colors of the images produced by the image-handling devices look almost the same.

In the image-processing method, the image data is corrected if the darkest points of the image-handling devices differ from each other, in consideration of the fact that adaptation to black varies from person to person. Hence, the colors of the images produced by the image-handling devices look almost the same even if the darkest points of the image-handling devices differ from each other.

As mentioned above, in the present invention, image data is corrected if the darkest points of image-handling devices differ from each other, in consideration of the fact that adaptation to black varies from person to person. Hence, the colors of the images produced by the image-handling devices look almost the same even if the darkest points of the image-handling devices differ from each other. In short, the present invention enables the devices of different types to reproduce color images that appears identical in color, although the adaptation to black varies from person to person

DETAILED DESCRIPTION OF THE INVENTION

Embodiments of the present invention will be described in detail, with reference to the accompanying drawings.

In the following description, any image displayed by an image display device shall be called soft copy image, and any image printed on a recording medium such as a paper sheet shall be called hard copy image. In other words, the media for soft copy images are image display devices, whereas the media for hard copy images are recording media such as paper sheets.

1. Structure of the Image-Processing Apparatus

Figure 1:
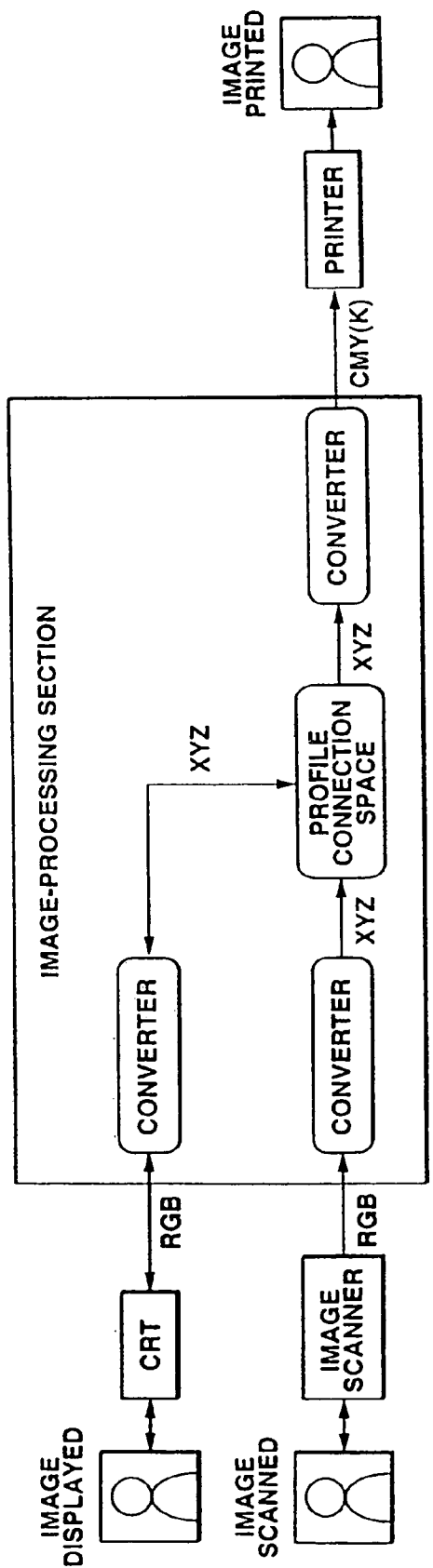
FIG. 1 is a schematic representation of a conventional image-processing apparatus.
Figure 2:
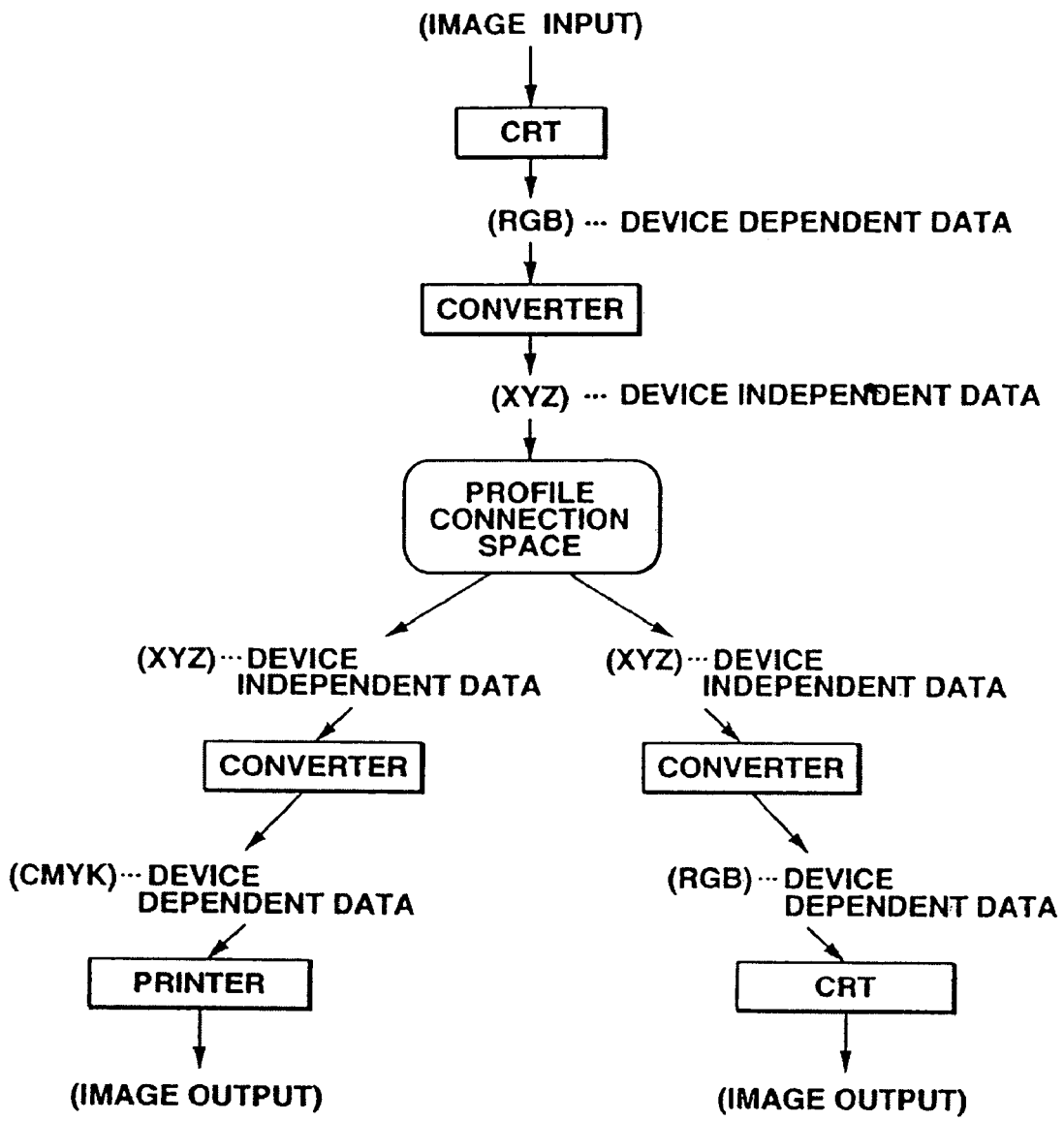
FIG. 2 is a diagram illustrating the flow of image data in the conventional image-processing apparatus.
Figure 3:
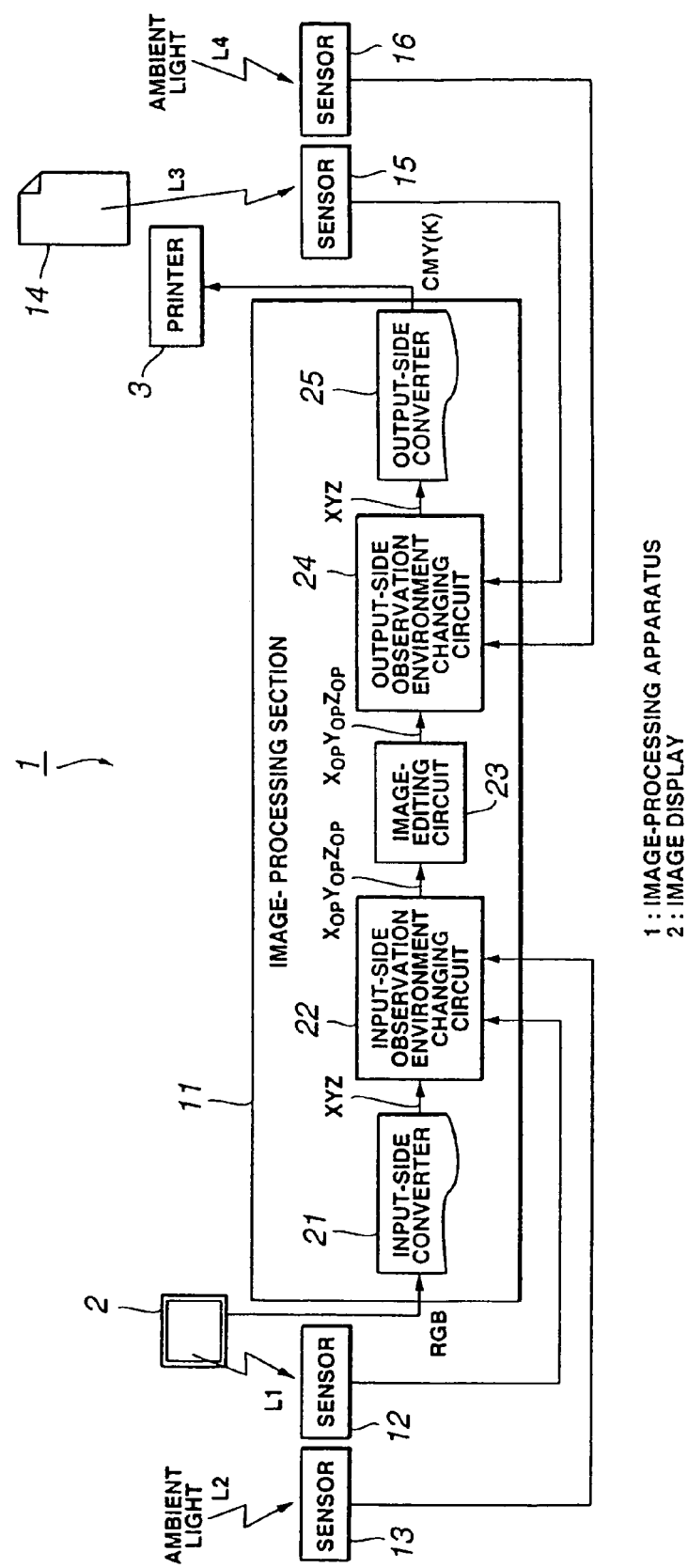
FIG. 3 is a diagram showing an image-processing apparatus according to the present invention.

FIG. 3 shows an image-processing apparatus 1 according to this invention. The image-processing apparatus 1 receives the image data representing the image displayed by an image display 2 such as a CRT display or a liquid crystal display. The apparatus 1 processes the image data and outputs the same to a printer 3.

In this case, the input-side device is the image display 2, and the output-side device is the printer 3. According to the present invention, however, the input- and output-side devices are not limited to an image display and a printer, respectively. For example, the input-side device may be an image scanner, a camera or the like, and the output-side device may be an image display or the like. As shown in FIG. 3, the input- and output-side devices are connected directly to the image-processing apparatus 1. Instead, these devices may be connected to the apparatus 1 by a network.

As shown in FIG. 3, the image-processing apparatus 1 comprises a image-processing section 11, a first input-side sensor 12, a second input-side sensor 13, a first output-side sensor 15, and a second output-side sensor 16. The image-processing section 11 processes the image data received from the image display 2. The first input-side sensor 12 receives light $L_1$ emitted from the image display 2, thereby detecting the reflectance and the like of the screen of the image display 2. The second input-side sensor 13 detects the ambient light $L_2$ existing at the time of observing the image displayed by the image display 2. The first output-side sensor 15 receives the light $L_3$ from a print sheet 14 on which the printer 3 will print the image, thereby detecting the total luminance and the like of the print sheet 14. The second output-side sensor 16 detects the ambient light $L_4$ existing at the time of observing the image printed on the print sheet 14 by the printer 3. The image-processing section 11 comprises an input-side converter 21, an input-side observation environment changing circuit 22, an image-editing circuit 23, an output-side observation environment changing circuit 24, and an output-side converter 25.

The input-side converter 21 receives the RGB value of the image displayed by the image display 2. Using an input-side device profile, the converter 21 converts the RGB value to an XYZ value, or a tristimulus value based on the human visual sense. The input-side device profile is a file that contains conversion formula or a conversion table for converting the RGB value received from the image display 2, to a XYZ value based on the human visual sense. The profile has been prepared on the basis of the characteristics of the image display 2. The XYZ value is supplied from the input-side converter 21 to the input-side observation environment changing circuit 22.

The input-side observation environment changing circuit 22 a conversion process based on a chromatic adaptation model (S-LMS) later described, on the XYZ value received from the input-side converter 21. Further, the circuit 22 performs a conversion process on the XYZ value so that the value may be used in the device optimal color space as will be described later Thus, the circuit 22 converts the XYZ value into an XYZ value ($X_{OP}Y_{OP}Z_{OP}$) for use in a device optimal color space. (Hereinafter, the XYZ value obtained by the conversion will be called $X_{OP}Y_{OP}Z_{OP}$ value. The $X_{OP}Y_{OP}Z_{OP}$ value is supplied from the input-side observation environment changing circuit 22 to the image-editing circuit 23.

To convert the XYZ value received from the input-side converter 21, the input-side observation environment changing circuit 22 receives, from the first input-side sensor 12, the detection signal representing the reflectance and the like of the screen of the image display 2. The circuit 22 also receives, from the second input-side sensor 13, the detection signal representing the ambient light $L_2$ that exists at the time of observing the image displayed by the image display 2. From in these detection signals the circuit 22 obtains the parameters concerning the environment in which the image displayed by the image display 2 is observed. Using the parameters, the circuit 22 performs a conversion process based on the chromatic adaptation model and a conversion process for making it possible to use the XYZ value in the device optimal color space.

The image-editing circuit 23 effects an image-editing process, such as color gamut compression, on the $X_{OP}Y_{OP}Z_{OP}$ value received from the input-side observation environment changing circuit 22. The $X_{OP}Y_{OP}Z_{OP}$ value, thus processed, is supplied from the image-editing circuit 23 to the output-side observation environment changing circuit 24.

The output-side observation environment changing circuit 24 processes the $X_{OP}Y_{OP}Z_{OP}$ value, thereby converting the same from one for use in the device optimum color space to one for use in an LMS color space. Further, the circuit 24 performs an inverse conversion process based on the chromatic adaptation model, which will be described later. Thus, the circuit 24 converts the $X_{OP}Y_{OP}Z_{OP}$ value received from the image-editing circuit 23, to an XYZ value, which is a tristimulus value, based on the human visual sense.

In order to convert the $X_{OP}Y_{OP}Z_{OP}$ value received from the image-editing circuit 23, the output-side observation environment changing circuit 24 receives the detection signal output from the first output-side sensor 15 and the detection signal output from the second output-side sensor 16. The detection signal output by the sensor 15 represents the total luminance and the like of the print sheet 14 on which the printer 3 will print the image. The detection signal output by the sensor 16 represents the ambient light $L_4$ existing at the time of observing the image printed on the print sheet 14 by the printer 3. From these detection signals the circuit 24 obtains parameters concerning the environment in which the image printed on the print sheet 14 by the printer 3 is observed. Using these parameters, the circuit 24 converts the $X_{OP}Y_{OP}Z_{OP}$ value, from one for use in the device optimum color space to one for use in an LMS color space, and effects conversion process based on the chromatic adaptation model.

The output-side converter 25 receives the XYZ value from the output-side observation environment changing circuit 24. The output-side converter 25 converts the XYZ value to a CMY value (or a CMYK value) that the printer 3 will used to print the image, by using the an output-side device profile. The output-side device profile is a file that contains conversion formula or a conversion table for converting the XYZ value based on the human visual sense to a CMY value, which the printer 3 will use to print the image.

The output-side profile has been prepared on the basis of the characteristics of the printer 3. The CMY value is supplied from the output-side converter 25 to the printer 3. The printer 3 prints the image on a print sheet 14.

2. Sequence of Processing Image Data

The above-mentioned sequence of processing image data will be explained, with reference to FIG. 4.

Figure 4:
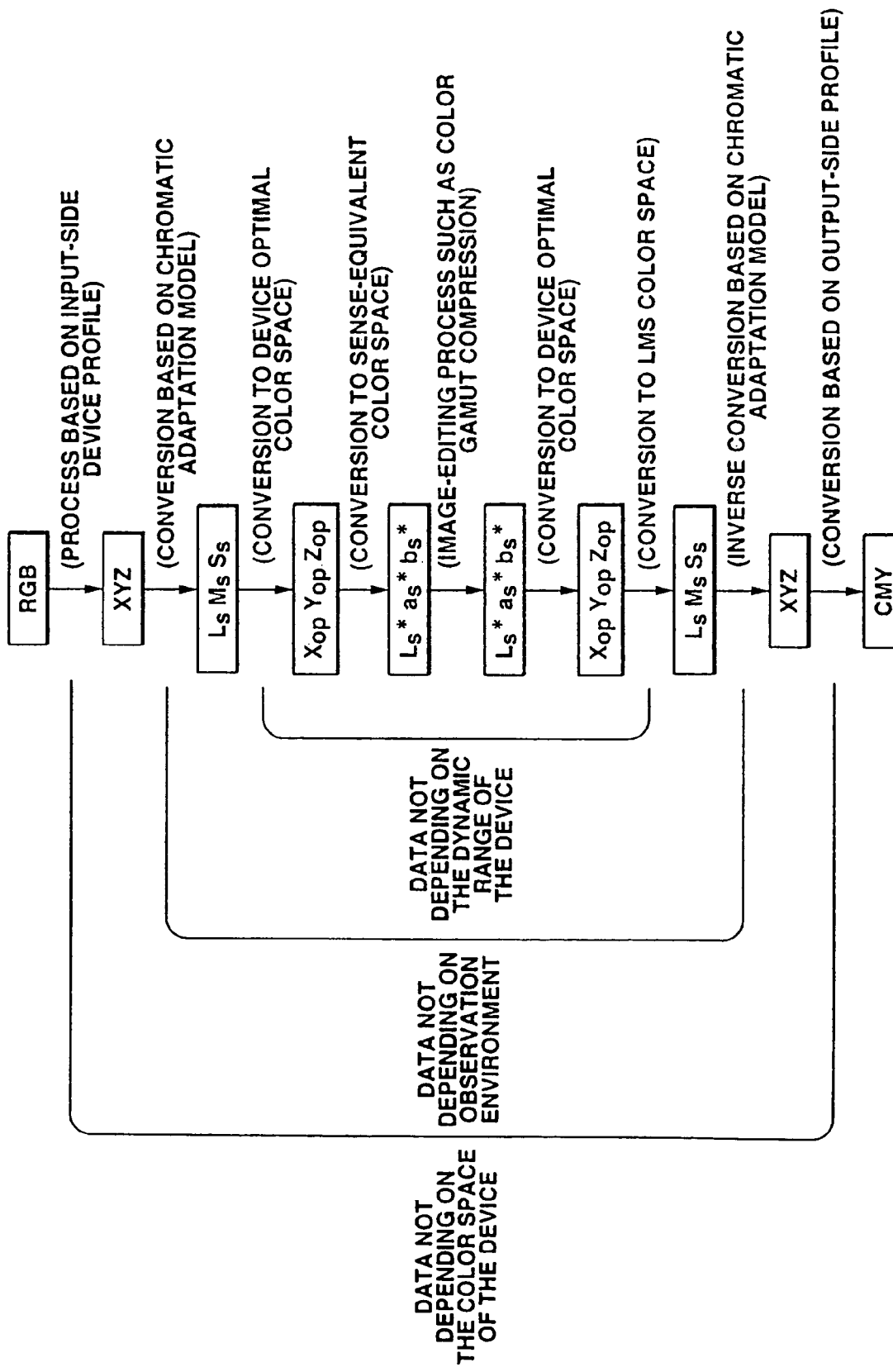
FIG. 4 is a diagram illustrating the image-processing sequence performed in the image-processing apparatus shown in FIG. 3.

As shown in FIG. 4, the input-side converter 21 performs a conversion process based on the input-side device profile, on the RGB value of the image displayed by the image display 2. The RGB value is thereby converted to an XYZ value.

Next, the input-side observation environment changing circuit 22 subjects the XYZ value to a conversion process based on the chromatic adaptation model. The XYZ value is thereby converted to an LMS value for used in an LMS color space that does not depend on the observation environment. (Hereinafter, the LMS value will be called $L_S M_S S_S$ value.)

The input-side observation environment changing circuit 22 converts the $L_S M_S S_S$ value to an $X_{OP} Y_{OP} Z_{OP}$ value for use in the device optical color space.

Next, the image-editing circuit 23 subjects the $X_{OP} Y_{OP} Z_{OP}$ value to an image-editing process, such as color gamut compression. In the image-editing process, the $X_{OP} Y_{OP} Z_{OP}$ value is converted to an L*a*b* value for use in a sense-equivalent color space. (Hereinafter, the L*a*b* value will be referred to as $L_S^* a_S^* b_S^*$ value.) The circuit 23 then performs the image-editing process, such as color gamut compression, on the $L_S^* a_S^* b_S^*$ value. Further, the circuit 23 converts the $L_S^* a_S^* b_S^*$ value, thus processed, to the $X_{OP} Y_{OP} Z_{OP}$ value for use in the device optimal color space.

Then, the output-side observation environment changing circuit 24 converts the $X_{OP} Y_{OP} Z_{OP}$ value to a $L_S M_S S_S$ value for use in the LMS color space that does not depend on the observation environment Further, the circuit 24 subjects the $L_S M_S S_S$ value to a conversion process based on the chromatic adaptation model, thus converting the $L_S M_S S_S$ value to an XYZ value.

Finally, the output-side converter 25 converts the XYZ value to a CMY value. The CMY value is output to the printer 3.

In the sequence of processing image data, described above, the data converted on the basis of the input-side device profile remains not depending on the color space of the device until it is subjected to the conversion process based on the chromatic adaptation model. The data converted on the basis of the data converted on the basis of the input-side device profile remains not depending on the color space of the device until it is subjected to the conversion process based on the chromatic adaptation model does not depend on the observation environment until it is subjected to the inverse conversion process based on chromatic adaptation model. The data converted for use in the device optical color space remains not depending on the dynamic range of the device until it is converted to an $L_S M_S S_S$ value for use in the LMS color space that does not depend on the observation environment.

3. Conversion Process Based on Color Adaptation Model

The conversion process, which the input-side observation environment changing circuit 22 performs in the image-processing apparatus 1 on the basis of the chromatic adaptation model, will be explained in detail. It should be noted that the output-side observation environment changing circuit 24 effects an inverse conversion process based on the chromatic adaptation model, as will be described below.

In an observation environment including ambient light, the color of the image appears differently to human eyes, because the ambient light influences the human eyes. Hence, a conversion process based on the chromatic adaptation model is carried out to compensate for the change in color of the image viewed in the observation environment that includes ambient light. In other words, the conversion process based on the chromatic adaptation model is a process of compensating for correcting the color of the image viewed in the observation environment that includes ambient light.

The chromatic adaptation model used here is fundamentally a Von Kries adaptation model. The model is processed in three major steps. The first step is correction of contrast, the second step is conversion of a tristimulus value to a cone signal, and the third step is correction of chromatic adaptation. Of these steps, the third is the most important. The third steps consists of two sub-steps. The first sub-step is consideration of incomplete adaptation, and the second sub-step is consideration of mixed adaptation. These steps of processing the chromatic adaptation will be explained below, one after another.

In the conversion process based on the chromatic adaptation model and the conversion process for obtaining values for use in the device optimal color space, both will be described later, some parameters are applied, which concern with the observation environment in which the image is looked at. These parameters are obtained from the detection signals generated by the first input-side sensor 12, the second input-side sensor 13, first output-side sensor 15, and second output-side sensor 16.

More specifically, in the conversion process performed by the input-side observation environment changing circuit 22, the parameters concerning the environment in which the image is observed are obtained from the reflectance and the like of the screen of the image display 2, which have been detected by the first input-side sensor 12, and the ambient light $L_2$ which exists at the time of observing the image displayed by the image display 2 and which has been detected by the second input-side sensor 13. Similarly, in the conversion process effected by the output-side observation environment changing circuit 24, the parameters concerning the environment in which the image is observed are obtained from the total luminance and the like of the print sheet 14, which have been detected by the first output-side sensor 15, and the ambient light $L_4$ which exists at the time of observing the image printed on the print sheet 14 by the printer 3 and which has been detected by the second output-side sensor 16.

(1) Correction of Contrast

Correction of contrast is first performed in the conversion process based on the chromatic adaptation model.

If the ambient light has high luminance, the image that the image display 2 displays will have low contrast. This is because the screen of the image display 2 reflects the ambient light, inevitably causing black-emphasis. Most image displays, such as CRT displays and liquid crystal displays, have an antireflection film on the screen. The antireflection film cannot completely prevent the reflection of ambient light at the screen. As long as the ambient light exists, the black reproduced on the screen cannot be darker than the black provided by the light reflected from the screen. As the CIELAB formula teaches, the human visual sense is keen to dark colors, and the contrast of the image decreases if black is emphasized. Therefore, the light reflected from the screen of the image display 2 is taken into consideration to accomplish the correction of contrast.

First, an offset value corresponding to the light reflected from the screen is added to the XYZ value that has been obtained by converting the RGB value of the image displayed by the image display 2. An X' Y' Z' value is thereby obtained as can be understood from the following equation (1-1). In the equation(1-1), the XYZ value is normalized with Y'$_{MW}$ expressed by the following equation(1-2), so that Y' may acquire the maximum value of 1. In the equations (1-1) and (1-2), $R_{bk}$ is the reflectance of the screen of the image display (usually, 3 to 5% in the case of CRT displays), $X_{PRD}Y_{PRD}Z_{PRD}$ is the absolute luminance that the ambient light has when reflected by a perfect reflecting diffuser, and $Y_{MW}$ is the absolute luminance of the white point of the medium (i.e., the image display 2).

$$\begin{bmatrix} \overline{X'} \\ \overline{Y'} \\ \overline{Z'} \end{bmatrix} = \frac{1}{Y'_{MW}} \left\{ \begin{bmatrix} X \\ Y \\ Z \end{bmatrix} + R_{bk} \cdot \begin{bmatrix} X_{PRD} \\ Y_{PRD} \\ Z_{PRD} \end{bmatrix} \right\} \text{ where} \quad (1\text{-}1)$$

$$Y'_{MW} = Y_{MW} + R_{bk} \cdot Y_{PRD} \quad (1\text{-}2)$$

Since the input-side device is the image display 2, it is desirable to perform the correction of contrast as has been described above. If the input-side device is an image scanner or the like and if the image subjected to the correction of contrast is a hard copy image, it will be unnecessary to carry out the correction of contrast. In such a case, the $\overline{X'Y'Z'}$ value is normalized with Y'$_{MW}$ expressed by the following equation (1-4), thereby obtaining $\overline{X'Y'Z'}$. In the equation (1-4), $Y_{paper}$ is the absolute luminance at the white point of the medium. In the case where an image scanner reads the image printed on a paper sheet, $Y_{paper}$ is the absolute luminance of the paper sheet on which the image has been printed.

$$\begin{bmatrix} \overline{X'} \\ \overline{Y'} \\ \overline{Z'} \end{bmatrix} = \begin{bmatrix} X/Y'_{MW} \\ Y/Y'_{MW} \\ Z/Y'_{MW} \end{bmatrix} \text{ where} \quad (1\text{-}3)$$

$$Y'_{MW} = Y_{paper} \quad (1\text{-}4)$$

(2) Conversion of Tristimulus Value (XYZ) to Cone Signal

Next, the tristimulus value (i.e., XYZ value) is converted to a cone signal (LMS value). This conversion process uses a matrix. The matrix formulae that can be applied to the conversion process are as follows.

(i) Hunt-Pointer-Estevez Conversion $$\begin{bmatrix} \overline{L} \\ \overline{M} \\ \overline{S} \end{bmatrix} = \begin{bmatrix} 0.3897 & 0.6890 & -0.7878 \\ -0.2298 & 1.1834 & 0.0464 \\ 0.0 & 0.0 & 1.0000 \end{bmatrix}_E \begin{bmatrix} \overline{X'} \\ \overline{Y'} \\ \overline{Z'} \end{bmatrix}_E \quad (1\text{-}5)$$

(ii) Bradford Conversion $$\begin{bmatrix} \overline{L} \\ \overline{M} \\ \overline{S} \end{bmatrix} = \begin{bmatrix} 0.8951 & 2.664 & -0.1614 \\ -0.7502 & 1.7135 & 0.0367 \\ 0.0389 & -0.0685 & 1.0296 \end{bmatrix}_E \begin{bmatrix} \overline{X'} \\ \overline{Y'} \\ \overline{Z'} \end{bmatrix}_E \quad (1\text{-}6)$$

(iii) sRGB Conversion $$\begin{bmatrix} \overline{L} \\ \overline{M} \\ \overline{S} \end{bmatrix} = \begin{bmatrix} 3.2406 & -1.5372 & -0.4986 \\ -09689 & 1.8758 & 0.0415 \\ 0.0557 & -0.2040 & 1.0570 \end{bmatrix}_E \begin{bmatrix} \overline{X'} \\ \overline{Y'} \\ \overline{Z'} \end{bmatrix}_E \quad (1\text{-}7)$$

The symbol for the sRGB conversion should be sRGB. Nonetheless, LMS is used in the equation (1-7) in order to harmonize the equation (1-7) with the other equations (1-5) and (1-6).

To convert the tristimulus value (XYZ value) to a cone signal (LMS value), the most appropriate matrix formula is selected from among the above-mentioned formulae in accordance with the characteristics and the like of the image, and X' Y' Z' are converted to LMS in accordance with the matrix formula selected.

The conversion of the tristimulus value (XYZ value) to the cone signal (LMS value) is not absolutely necessary. Rather, this conversion need not be carried out. If the conversion is not effected, the symbol of X' Y' Z' should be used in the equations that will follow. Instead, LMS will be used in the following equations for harmonization of description, even if this conversion is not performed.

(3) Correction of Chromatic Adaptation

Next, the correction of chromatic adaptation is performed in accordance with the environment in which the image is observed.

The receptor cells called ones in the human retina have their sensitivity changed to perceive a light source as being white, in the same manner as white balance is attained in a video camera That is, the signals generated by the cones are normalized with the value of the white point. To cope with the changes in the sensitivity of the cones, the chromatic adaptation is corrected on the basis of the Von Kries adaptation model.

The human visual sense is not always fully adapted to the white point of a light source. Hence, the chromaticity of the light is not used as the while point (hereinafter referred to as adaptation white point to which the human visual sense is adapted. Rather, in the present model, the adaptation white point is determined from incomplete adaptation and mixed adaptation.

(3.1) Incomplete Adaptation

When we look at the image displayed by the image display 2, our visual sense tries to adapt itself to the white point of the screen. Even if we observe the image in a dark room, the visual sense cannot be perfectly adapted to the white point if the white point greatly deviates from the standard illuminating light $D_{65}$. Particularly, the more the chromaticity of the white point deviates from that of the standard illuminating light $D_{65}$ or the standard illuminating light E, the more incomplete the adaptation is. In addition, the lower the luminance of the white point is, the more incomplete the adaptation is. In view of the incomplete adaptation, an adaptation white point (hereinafter called incomplete adaptation white point is determined in the image-processing apparatus 1.

The incomplete adaptation white point can be determined by, for example, the Hunt, R-LAB system, the Naya system and the CIECAM97s system. These systems will be described below. In the image-processing apparatus 1, the system, which seems the most appropriate in accordance with the characteristics and the like of the image, is selected from these systems, and the incomplete adaptation white point is determined by the system selected.

In the following equations, $\overline{L}'_{MW}\overline{M}'_{MW}\overline{S}'_{MW}$ is the LMS value of the incomplete adaptation white point, and $\overline{L}_{MW}\overline{M}_{MW}\overline{S}_{MW}$ is the LMS value obtained by normalizing the tristimulus value $X_{MW}Y_{MW}Z_{MW}$ of the absolute-luminance of the white point on the screen. The symbol $Y'_{MW}$ is the absolute luminance [cd/m²] represented by the equation (1-2) or (1-4) described above.

(i) Hunt, R-LAB system $$\begin{bmatrix} \overline{L}'_{MW} \\ \overline{M}'_{MW} \\ \overline{S}'_{MW} \end{bmatrix} = \begin{bmatrix} 1/P_L & 0 & 0 \\ 0 & 1/P_M & 0 \\ 0 & 0 & 1/P_S \end{bmatrix} \begin{bmatrix} \overline{L}_{MW} \\ \overline{M}_{MW} \\ \overline{S}_{MW} \end{bmatrix} \quad (1\text{-}8)$$

wherein $$\left.\begin{array}{l} P_L = (1 + Y'^{1/3}_{MW} + l_E)/(1 + Y'^{1/3}_{MW} + 1/l_E) \\ P_M = (1 + Y'^{1/3}_{MW} + m_E)/(1 + Y'^{1/3}_{MW} + 1/m_E) \\ P_S = (1 + Y'^{1/3}_{MW} + s_E)/(1 + Y'^{1/3}_{MW} + 1/s_E) \end{array}\right\} \quad (1\text{-}9)$$

$$\left.\begin{array}{l} l_E = 3 \cdot \overline{L}_{MW}/(\overline{L}_{MW} + \overline{M}_{MW} + \overline{S}_{MW}) \\ m_E = 3 \cdot \overline{M}_{MW}/(\overline{L}_{MW} + \overline{M}_{MW} + \overline{S}_{MW}) \\ s_E = 3 \cdot \overline{S}_{MW}/(\overline{L}_{MW} + \overline{M}_{MW} + \overline{S}_{MW}) \end{array}\right\} \quad (1\text{-}10)$$

(ii) Naya System $$\begin{bmatrix} \overline{L}'_{MW} \\ \overline{M}'_{MW} \\ \overline{S}'_{MW} \end{bmatrix} = \begin{bmatrix} 1/P'_L & 0 & 0 \\ 0 & 1/P'_M & 0 \\ 0 & 0 & 1/P'_S \end{bmatrix} \begin{bmatrix} \overline{L}_{MW} \\ \overline{M}_{MW} \\ \overline{S}_{MW} \end{bmatrix} \quad (1\text{-}11)$$

where $$\left.\begin{array}{l} P'_L = P_L \times k \\ P'_M = P_M \times k \\ P'_S = P_S \times k \\ k = 0.3710(\overline{L}_{MW}/P_L) + 0.6291(\overline{M}_{MW}/P_M) \end{array}\right\} \quad (1\text{-}12)$$

$$\left.\begin{array}{l} P_L = (1 + Y'^{1/3}_{MW} + l_E)/(1 + Y'^{1/3}_{MW} + 1/l_E) \\ P_M = (1 + Y'^{1/3}_{MW} + m_E)/(1 + Y'^{1/3}_{MW} + 1/m_E) \\ P_S = (1 + Y'^{1/3}_{MW} + s_E)/(1 + Y'^{1/3}_{MW} + 1/s_E) \end{array}\right\} \quad (1\text{-}13)$$

-continued $$\left.\begin{array}{l} l_E = 3 \cdot \overline{L}_{MW}/(\overline{L}_{MW} + \overline{M}_{MW} + \overline{S}_{MW}) \\ m_E = 3 \cdot \overline{M}_{MW}/(\overline{L}_{MW} + \overline{M}_{MW} + \overline{S}_{MW}) \\ s_E = 3 \cdot \overline{S}_{MW}/(\overline{L}_{MW} + \overline{M}_{MW} + \overline{S}_{MW}) \end{array}\right\} \quad (1\text{-}14)$$

(iii) System Adopting D Factor Used in CIECAM97s $$\left.\begin{array}{l} \overline{L}'_{MW} = \dfrac{\overline{L}_{MW}}{D + \overline{L}_{MW}(1-D)} \\ \overline{M}'_{MW} = \dfrac{\overline{M}_{MW}}{D + \overline{M}_{MW}(1-D)} \\ \overline{S}'_{MW} = \dfrac{\overline{S}_{MW}}{D + \overline{S}_{MW}(1-D)} \end{array}\right\} \quad (1\text{-}14)$$

$$\left.\begin{array}{l} D = F - F/[1 + 2(L_A^{1/4}) + (L_A^2/300)] \\ L_A = Y'_{MW}/5 \\ F = \text{const.} \end{array}\right\} \quad (1\text{-}15)$$

In the equation (1-15) presented above, F is a constant that depends on the observation environment. For example, F=1.9 if the observation environment is ordinarily luminous; F=0.9 if the environment is a dim, with a little amount of ambient light; and F=0.9 if the image is printed on a transparent paper sheet. A nonlinear exponential parameter needs to be provided for $\overline{S}'_{MW}$ in the actual CIECAM97s system, but such an exponential parameter is deleted from the equation (1-14) for the sake of simplicity. The exponential parameter may of course be taken into consideration.

If the image display 2 is the input-side device, it is desirable to apply incomplete adaptation. The input-side device may be an image scanner or the like, and the image processed may be a hard copy image. In this case, it is unnecessary to apply incomplete adaptation, and the value of $\overline{L}'_{MW}\overline{M}'_{MW}\overline{S}'_{MW}$ (LMS value), obtained by normalizing the tristimulus value $\overline{L}_{MW}\overline{M}_{MW}\overline{S}_{MW}$ of the white point of the medium, is applied without being modified, as can be seen from the following equation (1-16).

$$\begin{bmatrix} \overline{L}'_{MW} \\ \overline{M}'_{MW} \\ \overline{S}'_{MW} \end{bmatrix} = \begin{bmatrix} \overline{L}_{MW} \\ \overline{M}_{MW} \\ \overline{S}_{MW} \end{bmatrix} \quad (1\text{-}16)$$

(3.2) Mixed Adaptation

The image displayed by the image display 2, i.e., a soft copy image, is scarcely observed in a dark room. In most offices, the image is observed under fluorescent lamps that have a correlation color temperature (CCT) of about 4150K. On the other hand, the correlation color temperature of the white point of CRT displays widely as image displays is approximately 9300K. In the case of the soft copy image, the white point of the medium (i.e., image display 2) usually has a color temperature that differs from the color temperature of the ambient light.

In the case of the image printed on a recording medium (i.e., a hard copy image), the recording medium is usually a white paper sheet. The image may be printed on a yellowish paper sheet, such as newspaper sheets. If the recording medium is not perfectly white, the white point of the recording medium differs from the white of the ambient light. That is, in the case of a hard copy image, too, the white point of the recording medium (i.e., a paper sheet or the like) may differ from the color temperature of the ambient light in some cases.

In both the soft copy image and the hard copy image, the white point of the medium may differ from the color temperature of the ambient light. If so, the human visual sense is regarded as partly adapted to both the white point and the color temperature. Let us assume, therefore, that the white point to which our visual sense is adapted lies somewhere between the white point of the medium and the color temperature of the ambient light. Then, the LMS value (i.e., $\bar{L}''_{MW}\bar{M}''_{MW}\bar{S}''_{MW}$) of the white point to which our visual sense is actually adapted is defined by the following equations (1-17) and (1-18), where $R_{adp}$ is the adaptation ratio at which the human visual sense is adapted to the white of the medium.

$$\bar{L}''_{MW} = R_{adp} \cdot \left[\frac{Y'_{MW}}{Y_{adp}}\right]^{1/3} \cdot \bar{L}'_{MW} + (1 - R_{adp}) \cdot \left[\frac{Y_{PRD}}{Y_{adp}}\right]^{1/3} \cdot \bar{L}_{PRD} \quad (1\text{-}17)$$

$$\bar{M}''_{MW} = R_{adp} \cdot \left[\frac{Y'_{MW}}{Y_{adp}}\right]^{1/3} \cdot \bar{M}'_{MW} + (1 - R_{adp}) \cdot \left[\frac{Y_{PRD}}{Y_{adp}}\right]^{1/3} \cdot \bar{M}_{PRD}$$

$$\bar{S}''_{MW} = R_{adp} \cdot \left[\frac{Y'_{MW}}{Y_{adp}}\right]^{1/3} \cdot \bar{S}'_{MW} + (1 - R_{adp}) \cdot \left[\frac{Y_{PRD}}{Y_{adp}}\right]^{1/3} \cdot \bar{S}_{PRD}$$

$$Y_{adp} = \{R_{adp} \cdot Y'^{1/3}_{MW} + (1 - R_{adp}) \cdot Y'^{1/3}_{PRD}\}^3 \quad (1\text{-}18)$$

In the equations (1-17) and (1-18), $\bar{L}_{PRD}\bar{M}_{PRD}\bar{S}_{PRD}$ is the LSM value that has been obtained by normalizing the tristimulus value $X_{PRD}Y_{PRD}Z_{PRD}$ of the absolute luminance of the ambient light reflected from a perfect reflecting diffuser. Symbol $Y'_{MW}$ is the absolute luminance of the white point of the medium. (The absolute luminance is one evaluated in consideration of the light reflected from the screen, if the medium is the image display 2). If the medium is the image display 2, $Y'_{MW}$ is the absolute luminance of the white point of the screen of the display 2. If the medium is a white paper sheet, $Y'_{MW}$ is the absolute luminance of the paper sheet.

Introduced into the equations (1-17) and (1-18) are weighting coefficients $(Y'_{NW}/Y_{adp})^{1/3}$ and $(Y'_{PRD}/Y_{adp})^{1/3}$. These coefficients are applied when the absolute luminance of the ambient light reflected from the perfect reflecting diffuser differs from the absolute luminance of the white point of the medium.

In the equations (1-17) and (1-18) presented above, it is desired that the adaptation ratio $R_{adp}$ be about 0.4 to 0.7 in normal environment. More precisely, is set to 0.6. The adaptation ratio $R_{adp}$ of 1.0 means that the human visual sense is perfectly (100%) adapted to the medium, not influenced by the ambient light at all. In other words, the ratio $R_{adp}$ is 1.0 when the human visual sense is adapted 100% to the image display 2, not influenced by the ambient light, if the medium used is the image display 2, or when the visual sense is adapted 100% to the recording medium, not influenced by the ambient light, if the recording medium used is, for example, a paper sheet. Conceptually, the ratio $R_{adp}$ of 1.0 is achieved when CIELAB is adjusted to the human visual sense. The value of 0.0 is attained when the human visual sense is adapted 100% to the ambient light. This is equivalent to the CIE/XYZ adjusted to the human visual sense.

(3.3) Correction of Color Adaptation, Based on Von Kries Model

The adaptation white point ($\bar{L}''_{MW}\bar{M}''_{MW}\bar{S}''_{MW}$) that has been obtained in consideration of the incomplete adaptation and mixed adaptation is substituted in the Von Kries adaptation rule, as indicated in the following equation (1-19). The color adaptation is thereby corrected, providing an LMS value ($L_S M_S S_S$) that does not depend on the observation environment. In the equation (1-19), LMS in the right side is a value obtained in the second step of converting a tristimulus value to a cone signal, which has been described above.

$$\begin{bmatrix} Ls \\ Ms \\ Ss \end{bmatrix} = \begin{bmatrix} 1/\bar{L}''_{MW} & 0 & 0 \\ 0 & 1/\bar{M}''_{MW} & 0 \\ 0 & 0 & 1/\bar{S}''_{MW} \end{bmatrix} \begin{bmatrix} \bar{L} \\ \bar{M} \\ \bar{S} \end{bmatrix} \quad (1\text{-}19)$$

The input-side observation environment changing circuit 22 of the image-processing apparatus 1 performs the conversion process based on the chromatic adaptation model Thus, the circuit 22 converts the XYZ value received from the input-side converter 21, to an LMS value ($L_S M_S S_S$) for the LMS color space that does not depend on the observation environment. The output-side observation environment changing circuit 24 of the image-processing apparatus 1 effects the inverse conversion process based on the chromatic adaptation model.

4. Conversion Process to the Device Optical Color Space

The conversion process to the device optimal color space, performed by the input-side observation environment changing circuit 22, will be described in detail.

The conversion process to the device optimal color space is carried out in consideration of black-adaptation correction. The black-adaptation correction is effected so that a color looks almost the same on whichever medium, even if the darkest points of the media have different tristimulus values. Suppose an image is merely converted from the color gamut of a medium to the color gamut of another medium. Then, the color of the image appears different to the human eyes if the darkest points of the media have different tristimulus values. This is inevitably because the adaptation to black varies from person to person. This is why the black-adaptation correction is performed, whereby the color looks almost the same on whichever medium even if the darkest points of these media have different tristimulus values.

Figure 5:
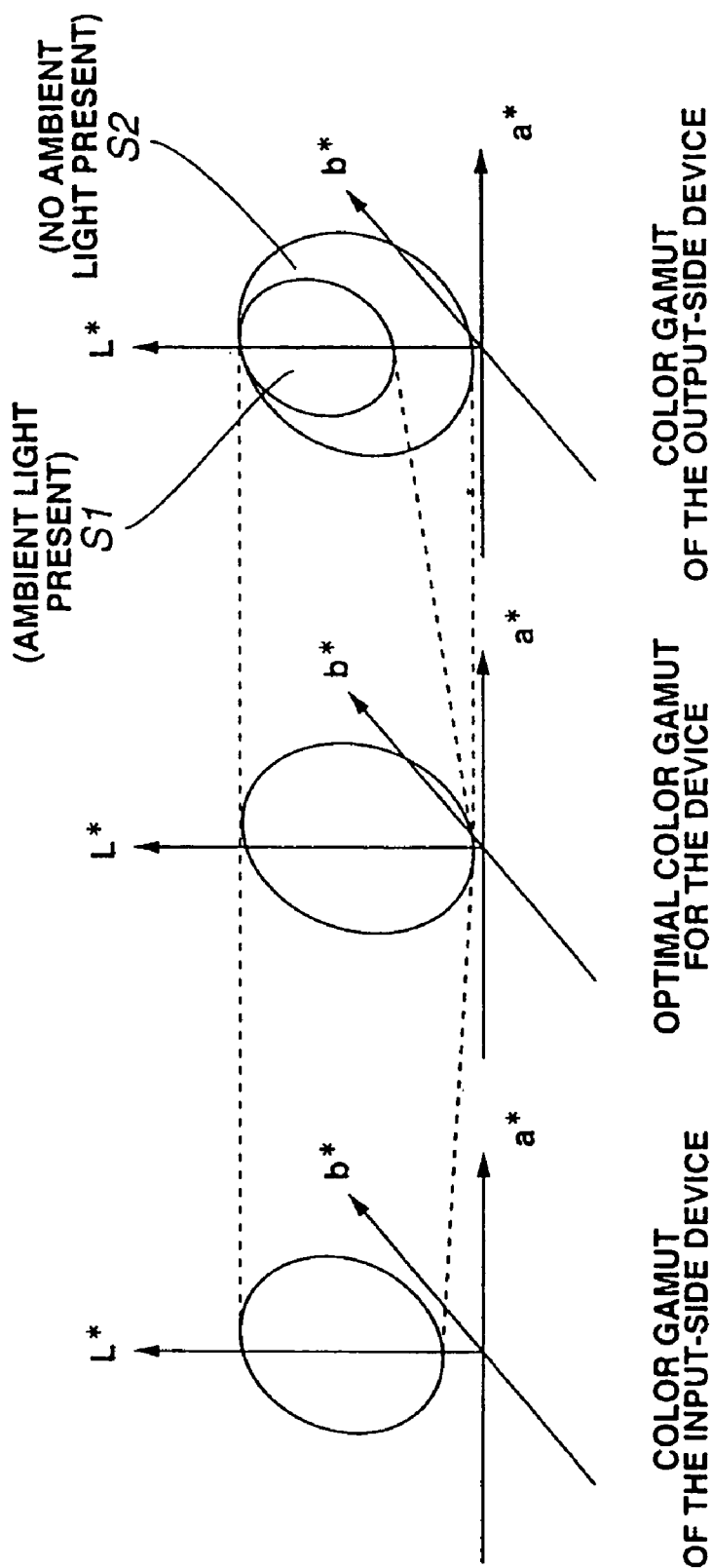
FIG. 5 is a diagram explaining the process of converting an image of the color gamut for the input-side device to an image of the color gamut for the output-side device, through a device optimal color space.

As shown in FIG. 5, the color space is changed to the device optimal color space, thus effecting the black-adaptation correction, in order to converts the image from the color gamut of the input-side device to the color gamut of the output-side device. Ambient light, if any, influences the human visual sense. Hence, the color gamut S1 the image has when ambient light exists differs from the color gamut S2 the image has when no ambient light exists.

As will be explained below, the black-adaptation correction is carried out by using the XYZ value of the darkest point on the medium (i.e., the XYZ value of the black point) and the XYZ value of the most luminous point on the medium (i.e., the XYZ value of the white point).

The conversion process to the device optimal color space is performed in consideration of black-adaptation correction, in the following manner. First, the LMS value ($L_S M_S S_S$) defined by the equation (1-19) is converted to a value ($X_S Y_S Z_S$) for use in the XYZ color space, as follows:

$$\begin{bmatrix} Xs \\ Ys \\ Zs \end{bmatrix} = \begin{bmatrix} 1.9102 & -1.1122 & 0.2019 \\ 0.3709 & 0.6291 & 0.0000 \\ 0.0 & 0.0 & 1.0000 \end{bmatrix}_E \begin{bmatrix} Ls \\ Ms \\ Ss \end{bmatrix} \quad (2\text{-}1)$$

The XYZ value ($X_{S,K} Y_{S,K} Z_{S,K}$) of the black point that man may perceive as being darkest is defined by the following equation (2-2). This if the black-adaptation correction.

$$\left. \begin{array}{l} X_{S,K}^{1/3} = K_{adp} \cdot X_{S,MK}^{1/3} + (1 - K_{adp}) \cdot X_{PK}^{1/3} \\ Y_{S,K}^{1/3} = K_{adp} \cdot Y_{S,MK}^{1/3} + (1 - K_{adp}) \cdot Y_{PK}^{1/3} \\ Z_{S,K}^{1/3} = K_{adp} \cdot Z_{S,MK}^{1/3} + (1 - K_{adp}) \cdot Z_{PK}^{1/3} \end{array} \right\} \quad (2\text{-}2)$$

Figure 6:
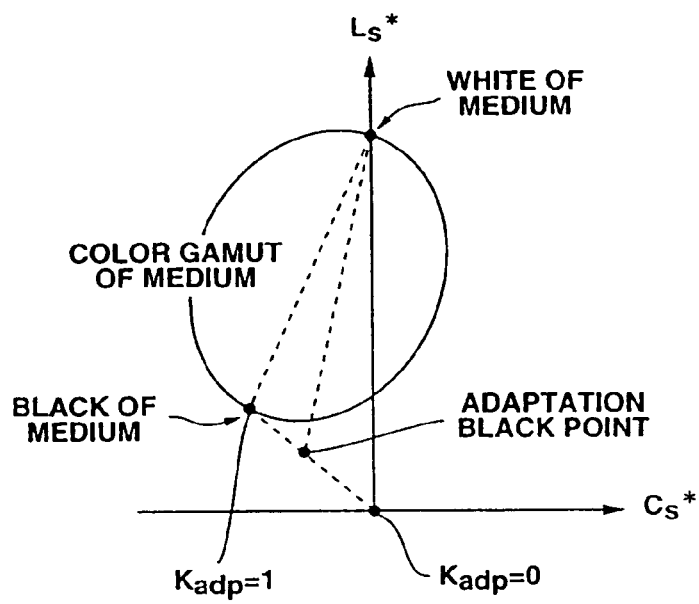
FIG. 6 is a graph representing the relationship between the color gamut of the medium and the black adaptation rate $K_{adp}$.

In the equation (2-2), $X_{S,MK} Y_{S,MK} Z_{S,MK}$ is the tristimulus value for the black point of the medium and $X_{PK} Y_{PK} Z_{PK}$ is the tristimulus value for the light reflected from the perfectly black part These values must be 0 in ideal condition. Symbol $K_{adp}$ is the rate of adaptation to the human eyes and ranges from 0 to 1. FIG. 6 shows the relationship between the color gamut of the medium and the rate $K_{adp}$ of adaptation to black. The adaptation rate $K_{adp}$ having this relationship with the color gamut of the medium is applied, accomplishing the black-adaptation correction.

As mentioned above, $X_{PK} Y_{PK} Z_{PK}$ is the tristimulus value for the light reflected from the perfectly black part and must be 0 in the ideal condition. Hence, we can have the following equation (2-3):

$$X_{PK} = Y_{PK} = Z_{PK} = 0 \quad (2\text{-}3)$$

Therefore, the equation (2-2) reduces to the following equation (2-4):

$$\left. \begin{array}{l} X_{S,K}^{1/3} = K_{adp} \cdot X_{S,MK}^{1/3} \\ Y_{S,K}^{1/3} = K_{adp} \cdot Y_{S,MK}^{1/3} \\ Z_{S,K}^{1/3} = K_{adp} \cdot Z_{S,MK}^{1/3} \end{array} \right\} \quad (2\text{-}4)$$

Next, the XYZ value ($X_{S,K} Y_{S,K} Z_{S,K}$) of the black point, which has been subjected to the black-adaptation correction, is applied to define the device optimal color space that is a color space corresponding to the dynamic range of the device. More specifically, the device optimal color space is defined as illustrated by the following equation (2-5). That is, the XYZ value $X_{S,K} Y_{S,K} Z_{S,K}$) of the black point, which has been subjected to the black-adaptation correction, is combined with the XYZ value (X=Y=Z=1) for the adaptation white point and is thereby defined as an exponential function. In accordance with the equation (2-5) the XYZ value ($X_S Y_S Z_S$) obtained by the process of the equation (2-1) is converted to an XYZ value ($X_{OP} Y_{OP} Z_{OP}$) in the device optimal color space that corresponds to the dynamic range of the device.

$$\left. \begin{array}{l} X_{op}^{1/3} = \left[ \dfrac{(X_S)^{1/3} - (X_{S,K})^{1/3}}{1 - (X_{S,K})^{1/3}} \right]^{\gamma_X} \\ Y_{op}^{1/3} = \left[ \dfrac{(Y_S)^{1/3} - (Y_{S,K})^{1/3}}{1 - (Y_{S,K})^{1/3}} \right]^{\gamma_Y} \\ Z_{op}^{1/3} = \left[ \dfrac{(Z_S)^{1/3} - (Z_{S,K})^{1/3}}{1 - (Z_{S,K})^{1/3}} \right]^{\gamma_Z} \end{array} \right\} \quad (2\text{-}5)$$

Figure 7:
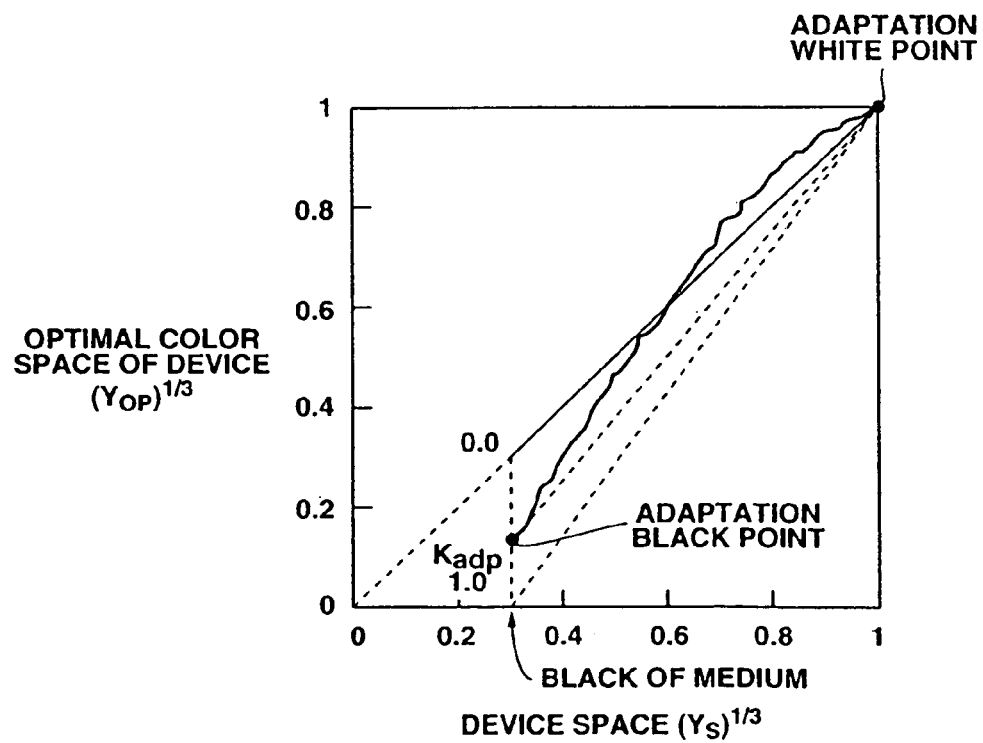
FIG. 7 is a graph shows the relationship between the Y value $(Y_{OP}^{1/3})$ present in the device optimal color space and the Y value $(Y_S^{1/3})$ present in the color space which is to be converted to the device optimal color space.

FIG. 7 is a graph showing an example of the function expressed by the above equation (2-5). In FIG. 7, the Y value ($Y_{OP}^{1/3}$) present in the device optimal, color space is plotted on the ordinate, and the Y value ($Y_S^{1/3}$) present in the color space to be converted to the device optimal color space is plotted on the abscissa. As FIG. 7 shows, the device optimal color space is only a fraction of the dynamic range if $K_{adp}=0$ (that is, if no black-adaptation correction is carried out). This space is one much contracted. If $K_{adp}$ is greater than 0 ($K_{adp}<0$), the device optimal color space expands. In particular, the device optimal color space becomes a space fully corresponding to the black adaptation when $K_{adp}=1.0$; it becomes a space that utilizes the entire dynamic range of the device.

The exponential parameters $\gamma_x$, $\gamma_y$, and $\gamma_z$ in the equation (2-5) are functions of $X_{S,K}$, $Y_{S,K}$ and $Z_{S,K}$, as is shown in the following equations (2-6):

$$\left. \begin{array}{l} \gamma_X = f(X_{S,K}) \\ \gamma_Y = f(Y_{S,K}) \\ \gamma_Z = f(Z_{S,K}) \end{array} \right\} \quad (2\text{-}6)$$

Figure 8:
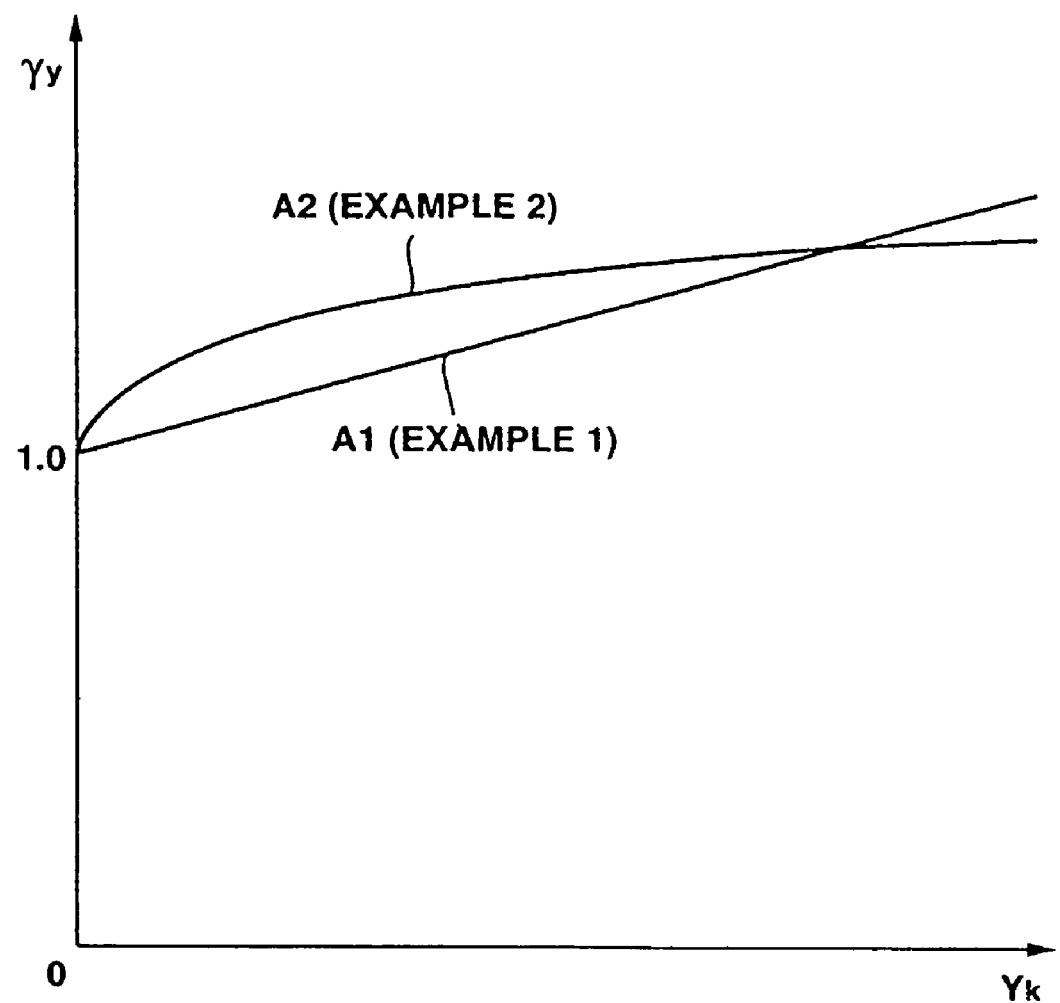
FIG. 8 is a graph representing specific examples of the function $\gamma_Y (=f(Y_{S,K}))$.

The results of the experiment the inventor conducted show that these exponential parameters $\gamma_x$, $\gamma_y$ and $\gamma_z$ should better be 1 when $X_{S,K}$, $Y_{S,K}$ and $Z_{S,K}$ is 0, and should better be greater than 1 and undergo simple increase when $X_{S,K}$, $Y_{S,K}$ and $Z_{S,K}$ is greater than 0. That is, it is desired that these parameters $\gamma_x$, $\gamma_y$, and $\gamma_z$ be defined as functions, each assuming the value of 1 when $X_{S,K}$, $Y_{S,K}$ and $Z_{S,K}$ is 0, and assuming the value greater than 1 and simply increasing when $X_{S,K}$, $Y_{S,K}$ and $Z_{S,K}$ is greater than 0. Specific examples of such a function are shown in FIG. 8. More precisely, FIG. 8 is a graph representing two examples A1 and A2 of the function f of the exponential parameter, i.e., $\gamma_y = f(Y_{S,K})$.

In the image-processing apparatus 1, the input-side observation environment changing circuit 22 performs the conversion process to the device optimal color space in consideration of the black-adaptation correction. Thus, the LMS value ($L_S M_S S_S$) obtained in the conversion process based on the color adaptation model is converted to an XYZ value ($X_{OP} Y_{OP} Z_{OP}$) for use in the device optimal color space that corresponds to the dynamic range of the device.

5. Process After Conversion to Device Optimal Color Space

The XYZ value ($X_{OP} Y_{OP} Z_{OP}$) obtained in the conversion process to the device optimal color space is supplied to the image-editing circuit 23. The image-editing circuit 23 performs an image-editing process, such as color gamut com pression. In the image-editing process, the $X_{OP}Y_{OP}Z_{OP}$ value is converted to an $L_S^*a_S^*b_S^*$ value. This conversion is expressed by the following equations (2-7):

$$\begin{aligned} L_S^* &= 116 \cdot (Y_{OP})^{1/3} \cdot 16 \\ a_S^* &= 500 \cdot \{(X_{OP})^{1/3} \cdot (Y_{OP})^{1/3}\} \\ b_S^* &= 200 \cdot \{(Y_{OP})^{1/3} \cdot (Z_{OP})^{1/3}\} \\ C_S^* &= \sqrt{(a_S^*)^2 + (b_S^*)^2} \\ hs^* &= \tan-1\left(\frac{b_S^*}{a_S^*}\right) \end{aligned} \quad (2\text{-}7)$$

Then, the image-editing circuit 23 performs an image-editing process, such as color gamut compression, on the $L_S^*a_S^*b_S^*$ value thus obtained. Thereafter, the image-editing circuit 23 converts the $L_S^*a_S^*b_S^*$ value to the $X_{OP}Y_{OP}Z_{OP}$ value. The $X_{OP}Y_{OP}Z_{OP}$ value is supplied to the output-side observation environment changing circuit 24. The image-editing process is not absolutely necessary in the present invention; it may not be carried out.

The $X_{OP}Y_{OP}Z_{OP}$ value is supplied to from the output-side observation environment changing circuit 24 to the output-side device through the output-side converter 25. The output-side converter 25 needs to have a color space optimal to it. This is because the $X_{OP}Y_{OP}Z_{OP}$ value must pass through an optimal color space before supplied to the output-side device. The optimal color space of the output-side device is identical to the optimal color space of the input-side device. Therefore, the following equations (2-8) hold true. Suffix IN to some symbols in the equations (2-8) et. seq. indicates that the values pertain to the input-side device, while suffix OUT to some other symbols means that the values pertain to the output-side device.

$$\begin{aligned} (X_{OUT,OP})^{1/3} &= (X_{IN,OP})^{1/3} \\ (Y_{OUT,OP})^{1/3} &= (Y_{IN,OP})^{1/3} \\ (Z_{OUT,OP})^{1/3} &= (Z_{IN,OP})^{1/3} \end{aligned} \quad (2\text{-}8)$$

The device optimal color spaces can be given by the equations (2-5) shown above. The equations (2-5) can be replaced by the following equations (2-9):

$$\left.\begin{aligned} \left[\frac{(X_{S,OUT})^{\frac{1}{3}} - (X_{S,OUT,K})^{\frac{1}{3}}}{1 - (X_{S,OUT,K})^{\frac{1}{3}}}\right]^{\gamma X,OUT} &= \left[\frac{(X_{S,IN})^{\frac{1}{3}} - (X_{S,IN,K})^{\frac{1}{3}}}{1 - (X_{S,IN,K})^{\frac{1}{3}}}\right]^{\gamma X,IN} \\ \left[\frac{(Y_{S,OUT})^{\frac{1}{3}} - (Y_{S,OUT,K})^{\frac{1}{3}}}{1 - (Y_{S,OUT,K})^{\frac{1}{3}}}\right]^{\gamma Y,OUT} &= \left[\frac{(Y_{S,IN})^{\frac{1}{3}} - (Y_{S,IN,K})^{\frac{1}{3}}}{1 - (Y_{S,IN,K})^{\frac{1}{3}}}\right]^{\gamma Y,IN} \\ \left[\frac{(Z_{S,OUT})^{\frac{1}{3}} - (Z_{S,OUT,K})^{\frac{1}{3}}}{1 - (Z_{S,OUT,K})^{\frac{1}{3}}}\right]^{\gamma Z,OUT} &= \left[\frac{(Z_{S,IN})^{\frac{1}{3}} - (Z_{S,IN,K})^{\frac{1}{3}}}{1 - (Z_{S,IN,K})^{\frac{1}{3}}}\right]^{\gamma Z,IN} \end{aligned}\right\} \quad (2\text{-}9)$$

The equations (2-9) can be changed to the following equations (2-10):

$$\begin{aligned} (X_{S,OUT})^{\frac{1}{3}} &= \left(1 - (X_{S,OUT,K})^{\frac{1}{3}}\right) \cdot \\ &\quad \left[\frac{(X_{S,IN})^{\frac{1}{3}} - (X_{S,IN,K})^{\frac{1}{3}}}{1 - (X_{S,IN,K})^{\frac{1}{3}}}\right]^{\gamma X,IN/\gamma X,OUT} + \\ &\quad (X_{S,OUT,K})^{\frac{1}{3}} \\ (Y_{S,OUT})^{\frac{1}{3}} &= \left(1 - (Y_{S,OUT,K})^{\frac{1}{3}}\right) \cdot \\ &\quad \left[\frac{(Y_{S,IN})^{\frac{1}{3}} - (Y_{S,IN,K})^{\frac{1}{3}}}{1 - (Y_{S,IN,K})^{\frac{1}{3}}}\right]^{\gamma Y,IN/\gamma Y,OUT} + \\ &\quad (Y_{S,OUT,K})^{\frac{1}{3}} \\ (Z_{S,OUT})^{\frac{1}{3}} &= \left(1 - (Z_{S,OUT,K})^{\frac{1}{3}}\right) \cdot \\ &\quad \left[\frac{(Z_{S,IN})^{\frac{1}{3}} - (Z_{S,IN,K})^{\frac{1}{3}}}{1 - (Z_{S,IN,K})^{\frac{1}{3}}}\right]^{\gamma Z,IN/\gamma Z,OUT} + \\ &\quad (Z_{S,OUT,K})^{\frac{1}{3}} \end{aligned} \quad (2\text{-}10)$$

From the equations (2-10) we can find the $X_S Y_S Z_S$ value for the output side. The inverse conversion represented by the equation (2-1) is effected, converting the $X_S Y_S Z_S$ value to the $L_S M_S S_S$ value for use in the LMS color space that does not depend on the observation environment. Thereafter, the inverse conversion process based on the color adaptation model is performed on the $L_S M_S S_S$ value, thereby converting the $L_S M_S S_S$ value to the XYZ value. The output-side observation environment changing circuit 24 supplies the XYZ value to the output-side converter 25.

The output-side converter 25 converts the XYZ value supplied from the circuit 24, to a CMY value on the basis of the output-side device profile. The output-side converter 25 outputs the CMY value to the printer 3.

As described above, the black-adaptation correction is effected the adaptation to black varies from person to person. As a result, the colors of the image appears almost the same in both the input-side device and the output-side device, even if the darkest points of the input- and output-side devices differ from each other. Thus, in the image-processing apparatus 1 described above, the image displayed by the image display 2 and the image printed by the printer 3 which has received the data representing the image produced by the display 2 looks almost the same, though the darkest points of the image display 2 and the printer 3 differ from each other.

6. Other Embodiments

In the embodiment shown in FIG. 3, the first and second input-side sensors 12 and 13 and the first and second output-side sensors 15 and 16 are used to obtain the parameters concerning the observation environment, which are applied in the image-converting process. These parameters may be input directly to the image-processing apparatus 1.

Figure 9:
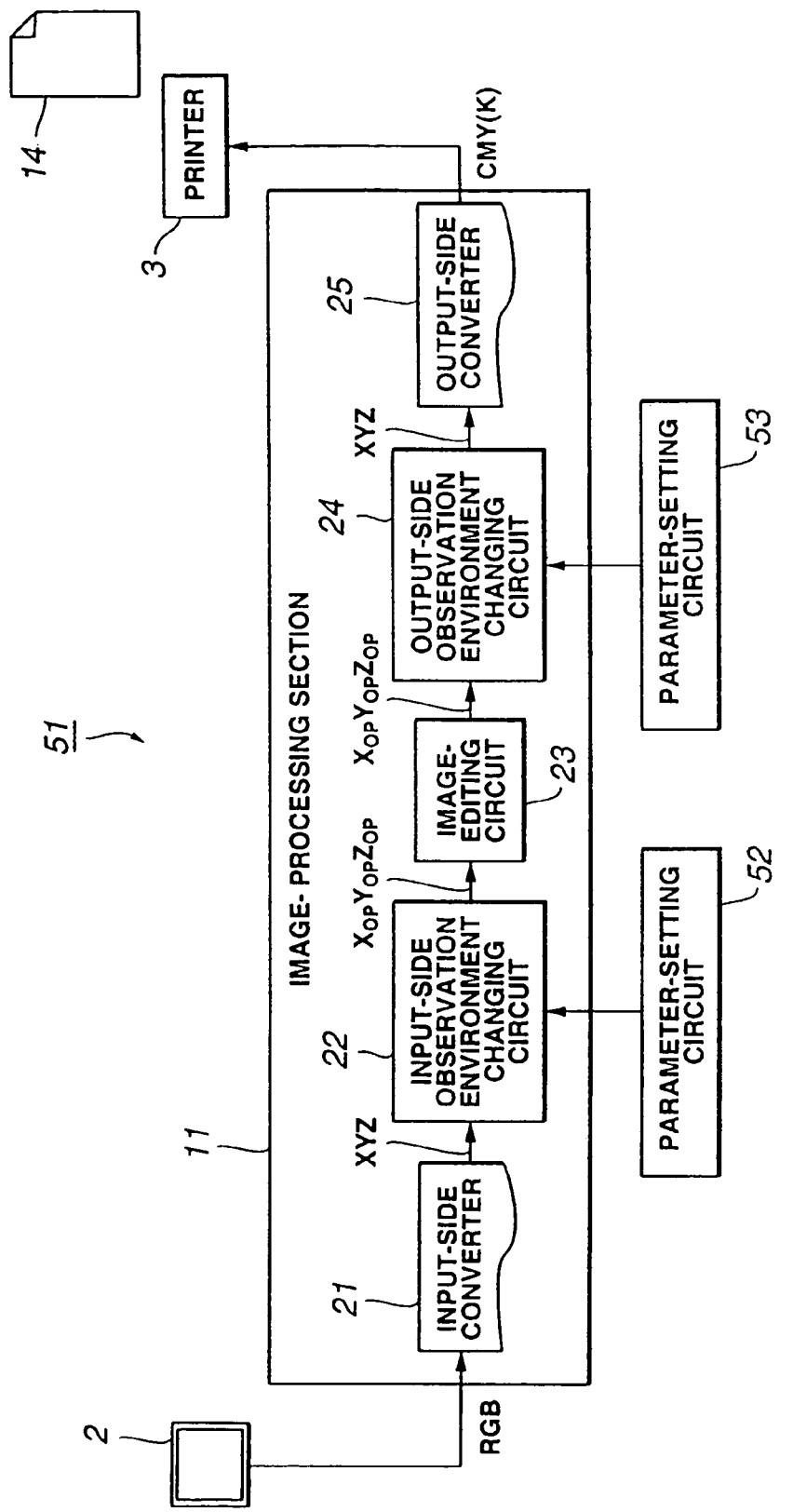
FIG. 9 is a diagram showing another image-processing apparatus according to the present invention.

FIG. 9 shows an image-processing apparatus 51 that directly receives the parameters concerning the environment in which the image is observed. The components of the apparatus 51 shown in FIG. 9, which are similar to those of the image-processing apparatus 1 shown in FIG. 3 are designated at the same reference numerals.

As is illustrated in FIG. 9, the image-processing apparatus 51 comprises two parameter-setting circuits 52 and 53, in place of the sensors 12, 13, 15 and 16 used in the image-processing apparatus 1 of FIG. 3. The parameter-setting circuit 52 is connected to the input-side observation environment changing circuit 22, and the parameter-setting circuit 53 to the output-side observation environment changing circuit 24.

In the image-processing apparatus 51, the parameters that the circuit 22 needs to convert image data are input to the circuit 22 via the parameter-setting circuit 52 connected to the input-side observation environment changing circuit 22. Using the parameters thus input, the input-side observation environment changing circuit 22 performs the conversion of image data. Further, the parameters that the circuit 24 needs to convert image data are input to the circuit 24 via the parameter-setting circuit 53 connected to the output-side observation environment changing circuit 24. Using these parameters, the output-side observation environment changing circuit 24 performs the conversion of image data.

Figure 10:
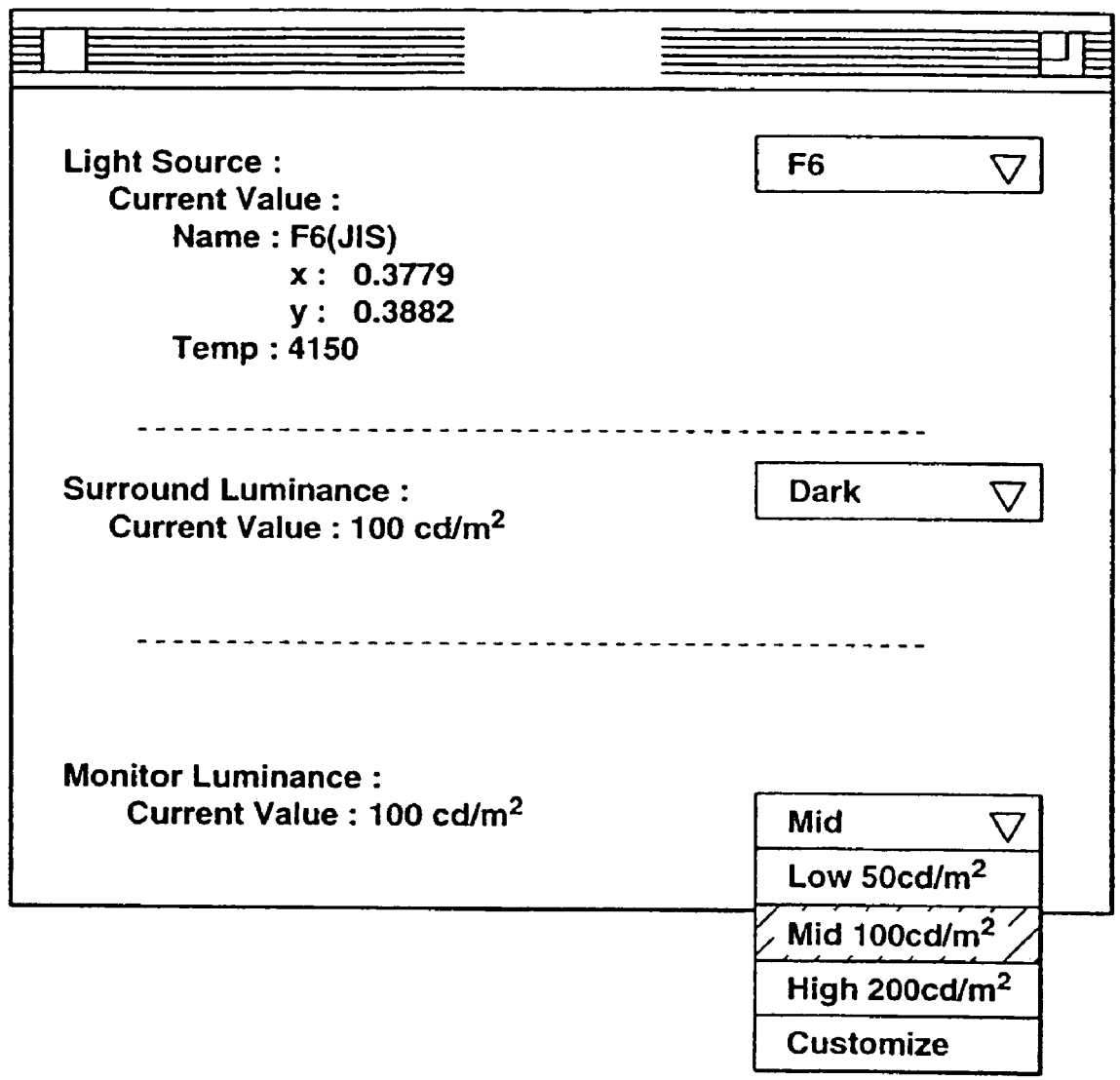
FIG. 10 is a diagram depicting a menu screen designed to set parameters concerning the environment in which an image is observed.

To input the parameters concerning the observation environment from the parameter-setting circuits 52 and 53, it is desired that a menu screen be used, which is, for example, such a graphical user interface as is illustrated in FIG. 10.

The screen menu shown in FIG. 10 is one used to cause the parameter-setting circuit 52 to set parameters. The screen menu is designed, enabling the user of the apparatus 51 to select an indoor-light chromaticity (light source), an indoor-light luminance (surround luminance) and a luminance for the image display 2 (monitor luminance), each from a plurality of choices. In the menu screen shown in FIG. 10, "F6", "Dark" and "Mid" are selected for the indoor-light chromaticity, indoor-light luminance and luminance for the image display 2, respectively.

The parameter-setting circuit 52 stores the parameters about the observation environment which correspond to these various choices. The parameter-setting circuit 52 reads the parameters that correspond to the choices selected and supplies these parameters to the input-side observation environment changing circuit 22. In the case of the menu screen shown in FIG. 10, the parameters corresponding to the "F6", "Dark" and "Mid" are selected for the indoor-light chromaticity 6, the indoor-light luminance "Dark", and the image display luminance "Mid" are supplied to the input-side observation environment changing circuit 22. The circuit 22 converts the image data in accordance with these parameters.

In the image-processing apparatus 1 of FIG. 3, the input-side device and the output-side device are the image display 2 and the printer 3, respectively. The input- and output-side devices are not limited to these For example, the input-side device and the output-side device may be an image scanner 62 and an image display 63, as in the image-processing apparatus 61 illustrated in FIG. 11. The components of this apparatus 61, which are similar to those of the apparatus 1 shown in FIG. 3, are designated at the same reference numerals as in FIG. 3.

Figure 11:
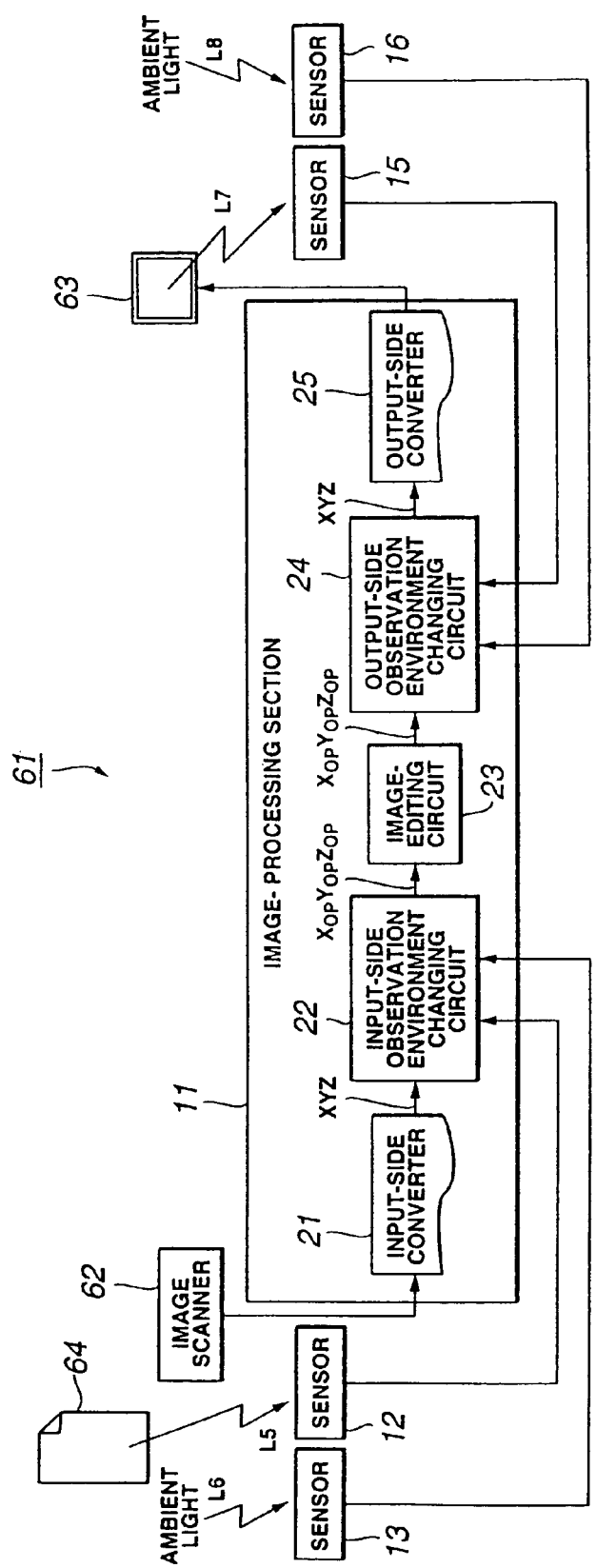
FIG. 11 is a diagram showing another image-processing apparatus according to the present invention.

In the image-processing apparatus 61 of FIG. 11, the first input-side sensor 12 detects the light $L_5$ reflected from the paper sheet 64 on which the image has been printed to be read by the image scanner 62. From the light $L_5$ the sensor 12 determines the total luminance of the printed paper sheet 64. The second input-side sensor 13 detects the ambient light $L_6$ existing when the image printed on the paper sheet 64 is observed. The first output-side sensor 15 detects the light $L_7$ from the image display 63 and determines therefrom the reflectance and the like of the screen of the image display 63. The second output-side sensor 16 detects the ambient light $L_8$ existing when the image displayed by the image display 63 is observed.

The present invention is not to the embodiments depicted in FIGS. 3 and 11. Rather, the invention can be applied to such a computer system 71 as is illustrated in FIG. 12.

Figure 12:
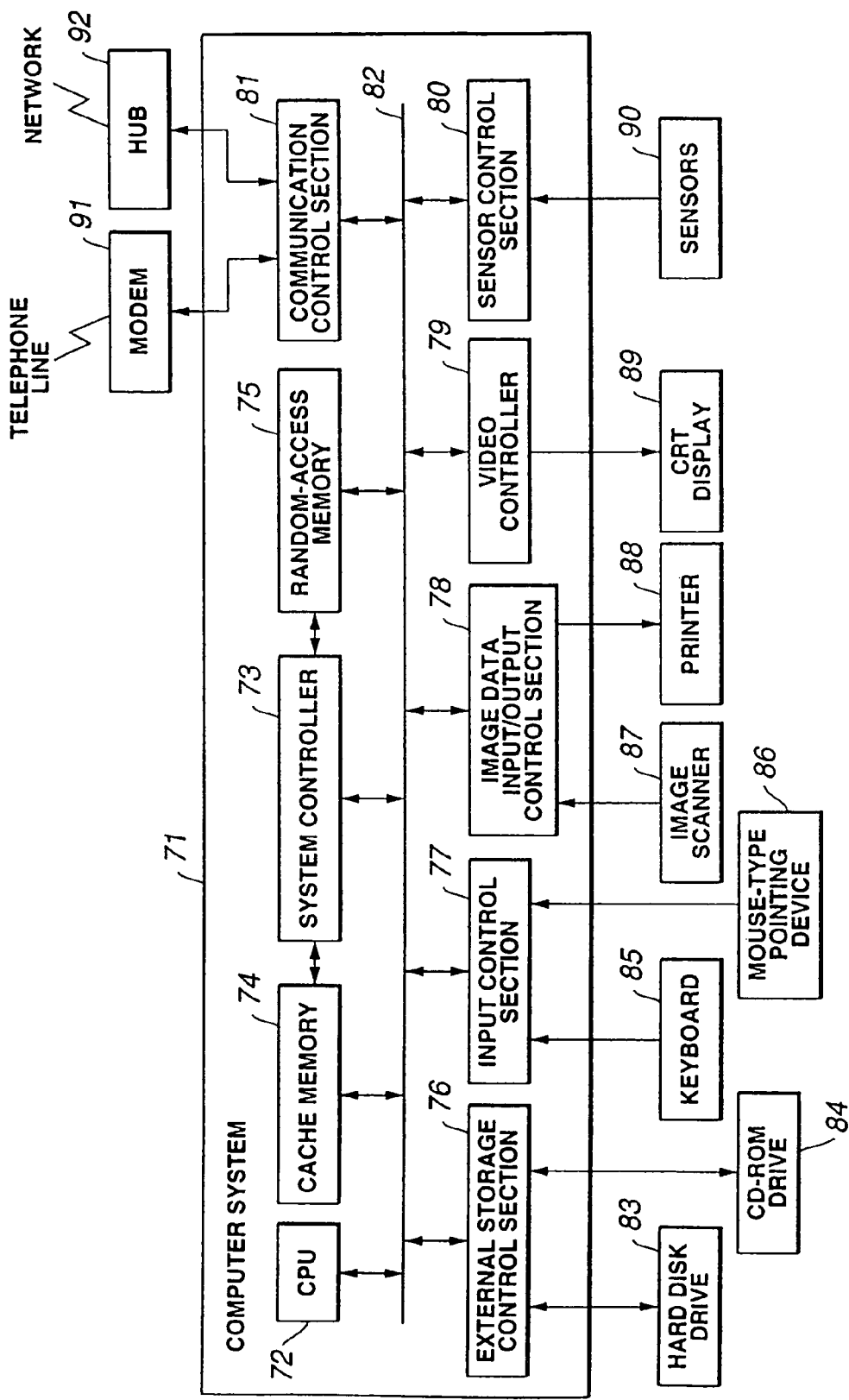
FIG. 12 is a diagram illustrating an image-processing apparatus according to the invention, which is provided in the form of a computer system.

The computer system 71 of FIG. 12 comprises a central processing unit (CPU) 72, a system controller 73, a cache memory 74, a random-access memory 75, an external storage control section 76, an input control section 77, an image data input/output control section, 78, a video controller 79, a sensor control section 80, and a communication control section 81. These components are connected to a bus 82.

The external storage control section 76 serves as an interface with an external storage device. The section 76 is connected to, for example, a hard disk drive 83 or a CD-ROM drive 84.

The input control section 77 functions as an interface with an input device. The section 77 is connected to, for example, a keyboard 85, a mouse-type pointing device 86.

The image data input/output control section 78 is provided as an interface with a device which handles image data. The section 78 is connected to, for example, an image scanner 87 or a printer 88.

The video controller 79 serves as an interface with an image display. It is connected to, for example, a CRT display 89.

The sensor control section 80 operates as an interface with external sensors. The section 80 is connected, for example, the first and second input-side sensors 12 and 13 and the first and second output-side sensors 15 and 16, all identical to their counterparts of the image-processing apparatus 1.

The communication control section 81 functions as an interface with a communication apparatus. The section 81 is connected to, for example, a modem 91 or a hub 92. The computer system 71 can therefore be connected to the telephone line by the modem 91 that is connected to the communication control section 81. Alternatively, the computer system 71 can be connected to a predetermined network by the hub 92 that is connected to the communication control section 81.

In the computer system 71, the CPU 72 processes image data in the same way as the image-processing section 11 does in the image-processing apparatus 1, under the control of the system controller 73 with the assistance of the cache memory 74 and random-access memory 75.

Hence, the computer system 71 receives the image data from the input-side device (e.g., image scanner 87 or the like) by the use of the image data input/output control section 78 or the video controller 79. In the system 71 the CPU 72 processes the image data in the same way as the image-processing section 11 does in the image-processing apparatus 1. The image data thus processed is output to the output-side device (e.g., printer 88, CRT display 89, or the like) through the image data input/output control section 78 or the video controller 79.

The black-adaptation correction is effected in the computer system as in the image-processing apparatus 1 when the CPU 72 processes the image data, because the adaptation to black varies from person to person As a result, the colors of the images produced by the input- and output-side devices look almost the same, even if the darkest points of the input- and output-side devices differ from each other.

What is claimed is:

1. An image-processing apparatus for processing the image data input from an image-handling device and then outputting the image data to another image-handling device, said apparatus comprising:

black-adaptation correction means for correcting the image data, such that colors of the image data produced by the image-handling devices are similar, by first converting means for converting an RGB value to a first XYZ value;

second converting means for converting the first XYZ value to a first LMS value;

third converting means for converting the first LMS value to a first $X_{op}Y_{op}Z_{op}$ value for use in an optical color space;

first performing means for performing image editing processing on the first $X_{op}Y_{op}Z_{op}$ value to obtain a $L_s a_s b_s$ value;

second performing means for performing image editing processing on the $L_s a_s b_s$ value;

fourth converting means for converting the edited $L_s a_s b_s$ value to a second $X_{op}Y_{op}Z_{op}$ value;

fifth converting means for converting the second $X_{op}Y_{op}Z_{op}$ value to a second LMS value for use in a LMS color space;

sixth converting means for converting the second LMS value to a second XYZ value; and seventh converting means for converting the second XYZ value to a CMY value;

wherein image data processing in the optical color space does not depend on a dynamic range of the image-handling devices and wherein $X_{op}Y_{op}Z_{op}$ represents the device optimal color space that corresponds to the dynamic range of the device.

* * * * *